United States Patent [19]

Zimmerman et al.

[11] Patent Number: 6,036,866

[45] Date of Patent: *Mar. 14, 2000

[54] APPARATUS AND METHOD FOR FLUID TREATMENT UNITS CONNECTED IN PARALLEL

[75] Inventors: Jeffrey A. Zimmerman, Forest Lake, Minn.; Dean A. Eldrenkamp, Schaumburg, Ill.

[73] Assignee: Ecodyne Water Treatment, Inc., Naperville, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/812,886

[22] Filed: Mar. 10, 1997

[51] Int. Cl.⁷ .................................................. B01D 21/30
[52] U.S. Cl. ........................ 210/670; 210/140; 210/142; 210/143
[58] Field of Search ..................... 210/662, 670, 210/677, 792, 96.1, 106, 142, 143, 264, 269, 284, 140

[56] References Cited

U.S. PATENT DOCUMENTS

| | | |
|---|---|---|
| Re. 18,909 | 8/1933 | Turner ........................................ 210/24 |
| 2,617,766 | 11/1952 | Emmett et al. ............................ 210/24 |
| 2,684,942 | 7/1954 | Tice ........................................... 210/24 |
| 2,800,229 | 7/1957 | Spaulding et al. ....................... 210/142 |
| 2,938,868 | 5/1960 | Carlson et al. ............................ 210/25 |
| 3,164,550 | 1/1965 | Lamkin ..................................... 210/89 |
| 3,366,241 | 1/1968 | McMorris ................................. 210/96 |
| 3,396,845 | 8/1968 | Bouskill .................................... 210/98 |
| 3,460,566 | 8/1969 | Heartstedt et al. ...................... 137/571 |
| 3,509,998 | 5/1970 | Pellett et al. .............................. 210/98 |
| 3,687,289 | 8/1972 | Tischler ..................................... 210/89 |
| 3,779,281 | 12/1973 | Brane ................................. 137/625.29 |
| 3,891,552 | 6/1975 | Prior et al. ................................. 210/88 |
| 3,933,631 | 1/1976 | Adams ..................................... 210/677 |
| 4,104,158 | 8/1978 | Davis ......................................... 210/25 |
| 4,181,605 | 1/1980 | Braswell ................................... 210/19 |
| 4,237,538 | 12/1980 | Le Dall .................................... 210/662 |
| 4,275,448 | 6/1981 | Le Dall ...................................... 210/97 |
| 4,305,826 | 12/1981 | Moses ...................................... 210/687 |
| 4,379,057 | 4/1983 | Meiser et al. ........................... 210/662 |
| 4,383,920 | 5/1983 | Muller et al. ........................... 210/96.1 |
| 4,385,357 | 5/1983 | Davis et al. ............................. 210/662 |
| 4,385,992 | 5/1983 | Clauer et al. ........................... 210/662 |
| 4,426,294 | 1/1984 | Seal ........................................ 210/662 |
| 4,427,549 | 1/1984 | Brown et al. ........................... 210/662 |
| 4,448,682 | 5/1984 | Moritz ..................................... 210/101 |
| 4,469,602 | 9/1984 | Seal ........................................ 210/662 |
| 4,470,911 | 9/1984 | Reinke .................................... 210/662 |
| 4,490,249 | 12/1984 | Seal .......................................... 210/89 |
| 4,659,460 | 4/1987 | Muller et al. ............................. 210/93 |
| 4,668,402 | 5/1987 | Norton .................................... 210/662 |
| 4,676,914 | 6/1987 | Mills et al. .............................. 210/741 |
| 4,693,814 | 9/1987 | Brown ...................................... 210/88 |

(List continued on next page.)

OTHER PUBLICATIONS

"Continuousequence Electro–Selector and Flow–Sensor Technical Service Manual," Water Refining Company, Inc., pp. 1–9, 1974.

*Primary Examiner*—Ivars Cintins
*Attorney, Agent, or Firm*—Piper Marbury Rudnick & Wolfe

[57] ABSTRACT

An apparatus and method for operating a system of two or more fluid treatment units connected in parallel, which fluid treatment units need to be regenerated as they become depleted, whereby a method is provided for determining when to initiate a regeneration and which unit to regenerate as well as an apparatus for implementing the same. The decision when to regenerate is based on the number of fluid treatment units in service and the fractional capacity of each fluid treatment unit in service. The fluid treatment selected for regeneration is the one with the least or nearly the least remaining capacity. The apparatus comprises a plurality of fluid treatment units; control valves to selectively connect each fluid treatment unit to a source of untreated fluid, a destination for treated fluid, and a source of regenerant; and a master controller to automatically implement the method of operation by controlling the valves appropriately.

18 Claims, 2 Drawing Sheets

U.S. PATENT DOCUMENTS

| | | | |
|---|---|---|---|
| 4,704,202 | 11/1987 | Poyner | 210/108 |
| 4,722,797 | 2/1988 | Gauer et al. | 210/662 |
| 4,737,275 | 4/1988 | Franks | 210/91 |
| 4,764,280 | 8/1988 | Brown et al. | 210/662 |
| 4,795,563 | 1/1989 | Auchincloss | 210/662 |
| 4,804,465 | 2/1989 | Brown | 210/136 |
| 4,889,623 | 12/1989 | Prior et al. | 210/190 |
| 4,938,874 | 7/1990 | Auchincloss | 210/662 |
| 4,990,245 | 2/1991 | Wieme | 210/96.1 |
| 5,022,994 | 6/1991 | Avery et al. | 210/670 |
| 5,069,779 | 12/1991 | Brown et al. | 210/87 |
| 5,073,255 | 12/1991 | Chili et al. | 210/96.1 |
| 5,089,140 | 2/1992 | Brane et al. | 210/678 |
| 5,300,230 | 4/1994 | Brane et al. | 210/662 |

Fig. 2

| UNITS IN *SERVICE* | PERCENT OF *PRESET* |
|---|---|
| 2 | 40% |
| 3 | 53% |
| 4 | 60% |

Fig. 3

| | NUMBER OF UNITS *IN SERVICE* | | | |
|---|---|---|---|---|
| CONDITION OF UNIT(S) | 1 | 2 | 3 | 4 |
| 4 UNITS ARE ≤ TO | - | - | - | 75% |
| 3 UNITS ARE ≤ TO | - | - | 66% | 50% |
| 2 UNITS ARE ≤ TO | - | 50% | 33% | 25% |
| 1 UNITS ARE ≤ TO | 0% | 0% | 0% | 0% |

APPARATUS AND METHOD FOR FLUID TREATMENT UNITS CONNECTED IN PARALLEL

BACKGROUND OF THE INVENTION

1. Field of the invention

The present invention relates to an apparatus and method for operating a system comprising two or more fluid treatment units connected in a parallel arrangement. More particularly, the present invention relates to a method for choosing when to regenerate a unit and which unit to regenerate and an apparatus for implementing the same.

2. Description of Related Art

In many applications, it is necessary or desirable to treat a fluid such as water prior to its use. Such treatments include but are not limited to softening of water, deionization of water, or filtering to remove solid matter from a fluid. To perform the desired treatment, the untreated fluid flows through a fluid treatment unit, which comprises one or more treatment stages, and flows out as treated fluid.

A plurality of fluid treatment units may also be connected in parallel. In this configuration, the stream of untreated fluid diverges into a plurality of streams with each separate stream of untreated fluid flowing into a separate fluid treatment unit for treatment and flowing out as a separate stream of treated fluid before being recombined into a common stream of treated fluid for use.

In the case of water softening, the fluid treatment unit is generally a pressurized tank containing an ion-exchange resin. As the water passes through the resin, objectionable ions present in the water, such as calcium, are exchanged for less objectionable ions present in the resin, such as sodium. As the resin in a particular unit is used to treat more and more water, it gradually becomes depleted of its exchange ions. The resins thus generally have a capacity to treat only a certain volume of water, and, if this volume is exceeded, the water flowing through thereafter will not be adequately treated.

Once they become depleted, normally the commercially available resins may be regenerated in order to be able to treat more water. Regeneration of these resins typically involves exposing them to a suitable solution, such as a brine, which contains the desired exchange ion. For water softening applications, the brine is typically made by dissolving a quantity of salt in water. The initial capacity to treat water of the newly regenerated resin can be determined based on the quantity of salt used in the regeneration process and the nature and volume of the resin.

Similarly, a filter used to remove solid matter will eventually become clogged with material and ineffective after a certain amount of use. Different filters thus have different capacities in terms of the volume of water they can effectively filter. Filters can often be regenerated by backflushing or similar processes.

During the regeneration process of a fluid treatment unit, however, the unit will not be available for treatment of the fluid. Therefore, in order to prevent interruption of service, several units are often connected in parallel. The advantage of this configuration is that when one unit is taken out of service for regeneration or for some other reason, fluid can still pass through the units that remain in service, thus allowing the fluid treatment process to continue despite the ongoing need to regenerate units.

Several different methods are known in the art for automatically regenerating fluid treatment units connected in a parallel configuration so as to minimize interruption of service. The simplest method is to regenerate a unit after a preset time has elapsed. One of the disadvantages of this method is that the actual remaining capacity of the unit after the preset time has elapsed is not taken into account. For example, if water demand has been low, then the unit may be regenerated even though it has much remaining capacity, resulting in a waste of regeneration salt. On the other hand, if water demand has been exceptionally high, then the unit may have become exhausted before the time period has elapsed for it to be regenerated. Inadequately treated water would have flown out of the system as a result.

Chili et al., U.S. Pat. No. 5,073,255 discloses the use of a bridge sensor to measure the conductivity of the ion exchange resin and to thereby regenerate the resin when the conductivity reaches a certain value. This method, however, is generally useful only for ion exchange systems. It could not be easily applied to systems which only filter the water.

Brane et al., U.S. Pat. No. 5,300,230 discloses a method whereby a regeneration is initiated whenever a certain volume of water, $V_s$, has been treated by any one of the units, where $V_s$ is the capacity of the smallest unit divided by the total number of units. The units are then regenerated sequentially. This method may require needlessly frequent regenerations if one of the units has a much lower capacity than the others. In addition, merely regenerating the next unit in a sequence does not take into account which unit may need regeneration the most. For example the "next" unit in the sequence may have a great deal of remaining capacity.

SUMMARY OF THE INVENTION

Accordingly, it is an object of this invention to provide a method of operating a fluid treatment system so as to allow for automatic regeneration of individual fluid treatment units without interruption of the production of treated water.

It is another object to provide a method of staggering the regeneration of individual fluid treatment units in order to ensure that at least one unit remains available to treat water at all times.

It is a further object of this invention to minimize the frequency of regeneration and to maximize the efficient use of regenerating material.

Still another object of this invention is to provide a method so that each fluid treatment unit is subjected to service volumes of fluid and frequencies of regeneration that are as similar as possible.

Yet another object of this invention is to provide an apparatus for implementing the desired method of operation.

In accordance with these and further objects of the present invention, an apparatus and method are disclosed for operating a fluid treatment system using two or more fluid treatment units connected in parallel. Three different variations of the method, or modes of operation, are provided: parallel, alternating, and variable.

In "parallel" mode, all of the units are in service treating fluid flowing therethrough until a certain condition is reached indicating the need to regenerate. The decision to regenerate is based on the number of units in service and the fractional capacity of each unit in service. In particular, when the fractional capacity of each of one or more units falls below certain preset levels, then the need to regenerate is indicated.

When the need to regenerate is indicated, the present method will then determine which unit to regenerate. Preferably, the unit with the least remaining capacity is regenerated. However, if more than one unit has a remaining capacity the same or similar to the least remaining capacity, then the unit with the longest time since its last regeneration is selected. However, if more than one these units has a time since last regeneration the same or similar to the longest time since last regeneration, then the unit with the lowest unit number is regenerated.

The "alternating" mode is similar to the parallel mode except that one of the units is not used to treat fluid but is kept as a standby. The decision of when to regenerate and which unit to regenerate is made as in the parallel mode based on the number of units actually in service. However, during the regeneration process the standby unit is brought into service so as to try to maintain a similar flow rate as before.

In the "variable" mode, some of the units are in service treating fluid while the remaining units are held in standby mode. The number of units in service is based on the actual flow demand. As the average per-unit flow exceeds a preset level for a certain amount of time, a standby unit is brought into service. Similarly, when the average per-unit flow drops below a preset level, a unit will go into standby mode. As with the alternating mode, the decision of when to regenerate and which unit to regenerate is based on the number of units actually in service. Also like the alternating mode, when a unit starts to regenerate, one of the standby units is brought into service.

BRIEF DESCRIPTION OF THE DRAWINGS

FIG. 2 is a table illustrating the percentage of the preset flow rate used to determine when to take a service unit standby mode when demand decreases for two, three, and four unit systems.

FIG. 3 is a table illustrating when the need to regenerate is indicated for two, three, and four unit systems in accordance with the present method.

DETAILED DESCRIPTION OF THE PREFERRED EMBODIMENT

Figure 1:
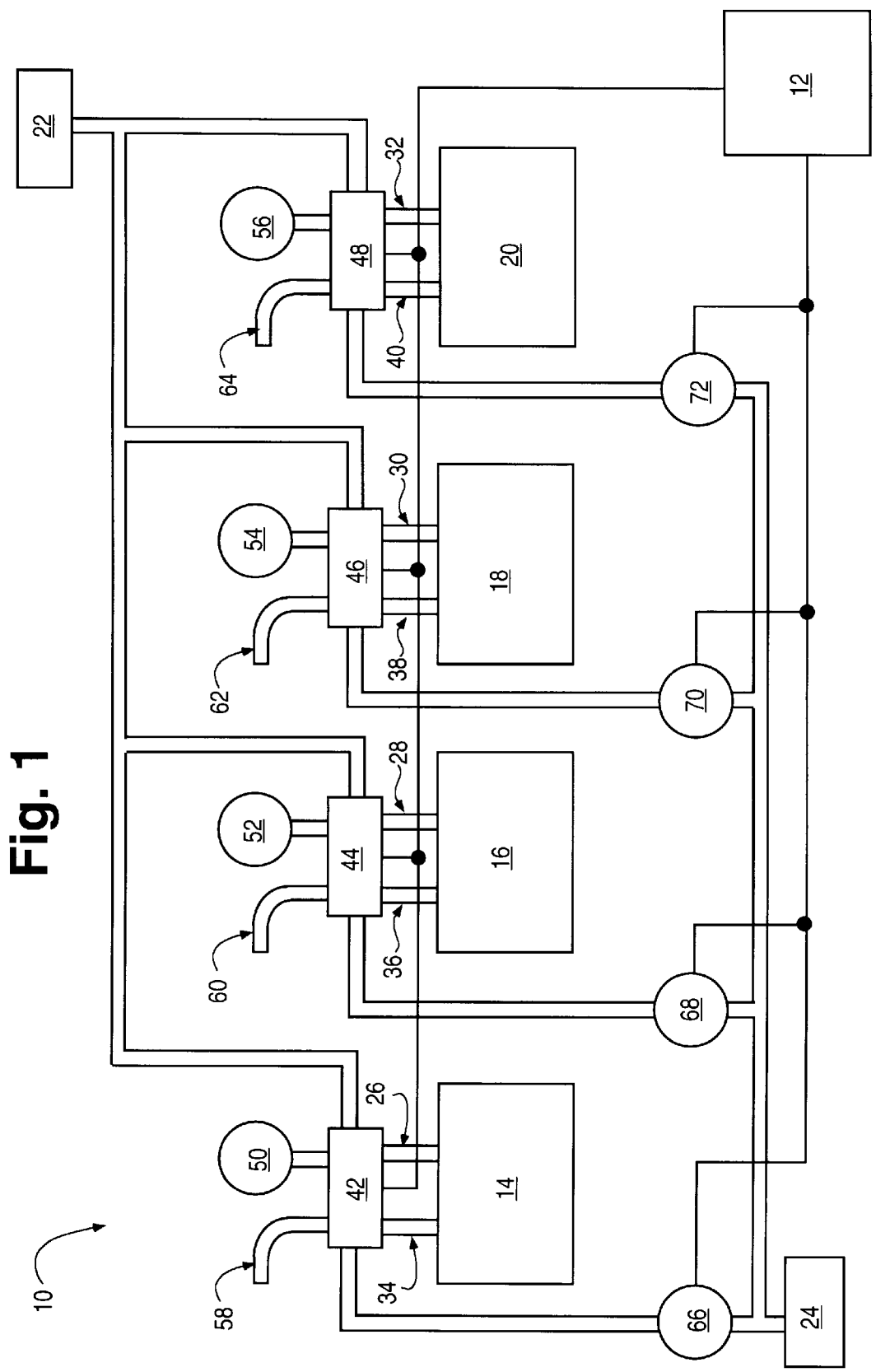
FIG. 1 is a schematic diagram of an illustrative apparatus for implementing the method of the present invention, wherein four fluid treatment units are used.

In the preferred embodiment, referring to FIG. 1, the method of the present invention is implemented in a fluid treatment system, generally designated 10, by programming a general purpose CPU or a specially designed computerized, master controller 12, which is capable of operating two or more fluid treatment units, such as water softening, water deionization, or water filtration units 14, 16, 18, 20. Those skilled in the art will recognize that the present method can be easily modified to control more or less than four of such fluid treatment units. The units 14–20 are connected in parallel, so that the untreated water flows into each of them from a common source 22 and the treated water flows out of each them and recombines to flow to destination 24.

Each unit 14–20 is provided with an inlet 26–32, an outlet 34–40, a control valve 42–48, a brine tank 50–56, and a drain 58–64. An example of a suitable control valve 42–48 is the Model 2900 manufactured by Fleck Controls, Inc. Many other models can also be used successfully. The master controller 12 is capable of electronically controlling valves 42–48 by configuring valve 42–48 into one of six unique operating positions: Standby, Service, Backwash, Brine/Slowrinse, Fast Rinse, and Refill/Service.

When a particular valve 42–48, for example valve 42, is in the Service position it is configured so that inlet 26 is connected to source 22, outlet 34 is connected to destination 24, and brine tanks 50 and drain 58 are unconnected. In the Service position, untreated water flows from source 22 into unit 14 through inlet 26, and treated water flows out of outlet 34 toward destination 24. When valve 42 is in the Service position, unit 14 is said to be "in service," and is capable of treating water.

When valve 42 is in the Standby position, inlet 26 is connected to source 22, while outlet 34, destination 24, brine tank 50 and drain 58 are unconnected. When valve 42 is in the Standby position, unit 14 is said to be "in standby mode." When unit 14 is held in standby mode, it is not treating water and water does not flow therethrough. Unit 14 remains connected to source 22 when in standby mode in order to maintain the pressure of the untreated water and thus prevent waterhammer when unit 14 is brought into service.

When valve 42 is in the Backwash position, outlet 34 is connected to source 22 and inlet 26 is connected to drain 58, while destination 24 and brine tank 50 remain unconnected. In this position, water flows through unit 14 in the opposite direction from when unit 14 is treating water in order to remove debris which may have accumulated in unit 14.

When valve 42 is in the Brine/Slowrinse position, brine tank 50 is connected to inlet 26, outlet 34 is connected to drain 58, and source 22 and destination 24 remain unconnected. In this position, brine flows from brine tank 50 through inlet 26 to unit 14 to replenish the resin therein (not shown), and the brine flows out of unit 14 through outlet 34 to drain 58.

When valve 42 is in the Fastrinse position, source 22 is connected to inlet 26, outlet 34 is connected to drain 58, while brine tank 50 and destination 24 remain unconnected. In this position, untreated water flows from source 22 through inlet 26 through the resin (not shown) in unit 14, and flows out through outlet 34 to drain 58. In this way, any excess brine remaining in unit 14 is rinsed out.

When valve 42 is in the Refill/Service position, source 22 is connected to inlet 26 and to brine tank 50, outlet 34 is connected to destination 24. In this position, untreated water flows from source 22 into both unit 24 for treatment and to brine tank 50 to refill it. In this way, unit 14 is able to be in service treating water while brine tank 50 is also being refilled.

A unit 14–20 can also be taken be taken off-line to allow, for example, maintenance to be performed on it. Off-line units are ignored by master controller 12. Preferably, manual valves (not shown) are provided to isolate from the system 10 a unit 14–20 which has been taken off-line.

The master controller 12 will determine when and which unit 14–20 needs to be regenerated and will then initiate the regeneration process for the selected unit. To regenerate one of units 14–20, for example unit 14, master controller 12 first changes the operating position of valve 42 from Service to Backwash. In the backwash phase, untreated water flows into unit 14 from outlet 34 and flows out through inlet 26 to drain 58. The backwash step is done to remove any debris which may have collected in unit 14. Next, master controller 14 brings valve 42 into the Brine/Slowrinse position. In this phase, brine from brine tank 50 enters unit 14 to replenish the resin (not shown) contained therein. When unit 14 has been exposed to the desired amount of brine, master controller 12 brings valve 42 into the Fast Rinse position. In this phase, untreated water flows into unit 14 from inlet 26 and out of unit 14 through outlet 34 to drain 58. In this way, any excess brine remaining in unit 14 is removed. Next, master controller 12 brings valve 42 into the Refill/Service position, whereby unit 14 is brought into service treating water while brine tank 50 is simultaneously being refilled. When brine tank 50 has been refilled, master controller 12 returns valve 42 to the Service position. During this process, unit 14 is not treating water during the Backwash, Brine/Slowrinse, and Fast Rinse phases. Those skilled in the art will recognize that the detailed process of regenerating unit 14 can be performed in other ways than previously described.

Each unit 14–20 is assigned a number so that the master controller 12 can identify a specific unit. The master controller 12 associates several different parameters or quantities with each unit: the flow rate through the unit, the unit's initial capacity, the unit's remaining capacity, the unit's fractional capacity, and the length of time since the unit's last regeneration. In the preferred embodiment, the master controller 12 automatically and continuously measures the flow rate through each unit 14–20 using a flow rate detector, such as a turbine 66–72. Those skilled in the art will recognize that other types of transducers could be used to measure the flow rate through each unit. Alternatively, the total flow rates through all of the units could be measured, and the master controller 12 could calculate the flow rate through each unit 14–20 based on the flow characteristics of each unit.

As used herein, "initial capacity" of a unit 14–20 refers to that total volume of fluid which could be treated by unit 14–20 before its treatment ability is exhausted or impaired at the point in time when unit 14–20 has just been regenerated. In the preferred embodiment, the initial capacity of each unit 14–20 is a quantity calculated by master controller 12 based on the particular regeneration characteristics used for each unit 14–20 as entered by an operator. For example, in the case of water softening systems, the initial capacity of a unit 14–20 is related to the quantity of salt that is used to regenerate that unit 14–20. Alternatively, the master controller 12 could automatically calculate the initial capacity of a unit 14–20 based on the characteristics of the regeneration actually performed. Those skilled in the art will recognize that other methods could be used to determine the initial capacity of unit 14–20.

As used herein, the "remaining capacity" of a unit 14–20 is that volume of fluid which a unit 14–20 could yet treat before the treatment ability of unit 14–20 would become exhausted or impaired. Several different means are used to measure the remaining capacity of each unit 14–20. In the preferred embodiment, the flow rate is measured through each unit 14–20 by means of a turbine 66–72. The master controller 12 then integrates the measured flow rates over time to calculate the total volume of water that has flowed through each unit 14–20. This result for a particular unit 14–20 is then subtracted from the initial capacity of unit 14–20 to calculate the remaining capacity of unit 14–20. Those skilled in the art will recognize that other methods are available for determining the remaining capacity of each fluid treatment unit depending on the particular application.

As used herein, the "fractional capacity" of a unit 14–20 is the remaining capacity of a unit 14–20 divided by the initial capacity of that unit 14–20. In the preferred embodiment, master controller 12 calculates the fractional capacity of each unit 14–20 by dividing its remaining capacity by its initial capacity. The master controller 12 also automatically keeps track of the amount of time that has elapsed since each unit 14–20 has been regenerated. Controllers with these basic capabilities have been known in the art. The present invention relates to the water treatment method by which the master controller is programmed as described to operate two or more fluid treatment units 14–20, where each unit 14–20 is capable of being regenerated and the apparatus constituted thereby.

In the preferred embodiment, the master controller 12 is programmed to operate in the parallel, alternating, or variable modes, as determined by an operator. In the parallel mode all of the units 14–20 controlled by master controller 12 are normally in service treating water, except when one or possibly more of the units 14–20 are being regenerated. It is to be understood that in the parallel and other modes, one or more units 14–20 can also be taken off-line for purposes such as maintenance. In the preferred embodiment, provision is made for an operator to manually indicate that a particular one of units 14–20 is to be taken off-line, in which case this one of units 14–20 is ignored by master controller 12 until manually brought back on-line.

In the alternating mode one of the units 14–20 is kept in standby mode and is brought into service when another unit 14–20 is taken out of service to begin its regeneration process. At the conclusion of this regeneration process, that unit 14–20 just regenerated then becomes the standby unit.

In the variable mode, some of the units 14–20 are in service and some are kept in standby mode. The number of units 14–20 put into service is based on the actual flow demand. If the average per-unit flow rises above a preset level for a certain period of time, then a standby unit 14–20, if available, is brought into service by the master controller 12. As used herein, "average per-unit flow" is the total flow through all of the units 14–20 which are in service divided by the number of units 14–20 in service. In the preferred embodiment, this certain period of time is one minute; however, other time periods, including zero, could be used. The preset level is set on the master controller 12 by an operator with zero taken as a default value.

It will be understood that when another unit 14–20 is brought into service, the average per-unit flow rate decreases so that a single preset level can be used for any number of units 14–20. Alternatively, the decision of when to bring a standby unit 14–20 into service could be based on the total flow through the units 14–20, but that if N units 14–20 were available then N−1 preset levels would be required.

The standby unit 14–20 to be brought into service is selected as described below. The standby unit 14–20 with the least remaining capacity is selected unless there is more than one standby unit with the same or similar remaining capacity. In the preferred embodiment, a 4-bit microprocessor is used for the numerical calculations, so that there is a certain precision to which the remaining capacities are known by master controller 12. Also, fully regenerated units 14–20 will appear to master controller 12 to have the same remaining capacities because they will all be at full remaining capacity. The case will thus often arise that the remaining capacities of two or more units 14–20 will appear identical to the master controller 12. In particular, two or more of the standby units 14–20 might be indicated by master controller 12 as having the least remaining capacity of all the standby units 14–20. Alternatively, a certain quantity could be chosen so that, if the remaining capacities of any two units 14–20 differ by less than this quantity, they are deemed similar enough that this selection criterion is not to be used. In either case, a different criterion can be used to determine which of the two or more standby units 14–20 to bring into service. In the present invention, if the remaining capacities of two or more standby units 14–20 are the same as or differ by less than this predetermined quantity from the least remaining capacity, then, from among this subset of standby units 14–20, that standby unit 14–20 is selected which has the longest time since regeneration. Again, because of the finite precision by which the master controller 12 keeps track of time, two or more standby units 14–20 may have indicated the same length of time since last regeneration. Alternatively, as before, the lengths of times since last regeneration could be deemed similar if they differ by less than a predetermined amount. Finally, if two or more standby units 14–20 have lengths of time since last regeneration which are the same as or which differ by less than this predetermined amount from the greatest length of time since last regeneration, then, from among this subset of standby units 14–20, that standby unit 14–20 with the lowest unit number is chosen to be brought into service. Because units have unique numbers assigned to them, this final criterion will always yield a result if the earlier criteria do not.

To summarize, the standby unit 14–20 selected to be brought into service is determined from the following priority rules: (1) the unit 14–20 with the least remaining capacity unless two or more units have the same or similar remaining capacity; (2) the unit 14–20 that has the longest time since regeneration unless two or more units have the same or similar times since last regeneration; and (3) the unit 14–20 with the lowest unit number.

In the variable mode, if the average per-unit flow drops below a preset level, then a unit 14–20 in service is taken out of service and held in standby mode. In the preferred embodiment, this preset level is set as a fixed percentage of the preset level used to determine when another unit 14–20 is to be brought into service, depending on the number of units 14–20. The preferred percentages are shown in FIG. 2, but other percentages could be used. Moreover, in general, the preset flow rates used to determine when to take a unit 14–20 out of service could be set independently of the preset flow rates used to determine when to bring a unit 14–20 into service.

The unit 14–20 which is taken out of service is determined by the following priority rules: (1) the unit 14–20 with the most remaining capacity, unless two or more units 14–20 have the same or similar capacities; (2) the unit 14–20 that has the shortest time since regeneration, unless two or more units 14–20 have the same time since regeneration; and (3) the unit 14–20 with the lowest unit number. In the preferred embodiment, a unit 14–20 stays in service for at least 30 minutes, i.e., if the unit 14–20 selected to be taken out of service has been in service for less than 30 minutes, then the master controller 12 waits until the unit has been in service for at least 30 minutes before taking it out of service. This helps prevent excessive cycling between service and standby modes which would be caused by momentary changes in flow. However, this minimum in service time can be changed and even set to zero without departing from the teachings of the present invention.

In all three modes of operation, the decisions of when to regenerate and which unit 14–20 to regenerate are made in a similar manner. The master controller 12 automatically initiates a regeneration based on the number of units 14–20 in service and the fractional capacities of each of the units 14–20 in service as indicated in FIG. 3. For example, if four units 14–20 are in service, then the master controller 12 will initiate a regeneration if the four units 14–20 each have a fractional capacity less than or equal to 75%, or if any three units 14–20 each have a fractional capacity less than or equal to 50%, or if any two units 14–20 each have a fractional capacity less than or equal to 25%, or if any unit 14–20 has a fractional capacity equal to zero. The criteria expressed in FIG. 3 can be generalized in the following way. Given N units 14–20 in service, a regeneration should be initiated whenever any k units 14–20 in service each have a fractional capacity less than or equal to (k−1)/N, where k is an integer from one to N. Which unit 14–20 to regenerate is determined from the following priority rules: (1) the unit 14–20 with the least remaining capacity, unless two or more units 14–20 have the same or similar remaining capacities; (2) the unit 14–20 with the longest time since regeneration, unless two or more units 14–20 have the same or similar lengths of time since last regeneration; and (3) the unit 14–20 with the lowest unit number.

While the percentages set forth in FIG. 3 and summarized in the (k−1)/N expression are preferable, other percentages could be used without deviating from the present invention. In general, if N units 14–20 are being used to treat fluid, then N threshold values, $F_k$, are provided, where each $F_k$ is a number between zero and one, and each $F_{k+1}$ is greater than $F_k$. A regeneration is indicated when any k number of units 14–20 each have a fractional capacity less than or equal to $F_k$.

In addition, in the preferred embodiment the master controller is provided with a "Minimum Number of Units" setting which can be entered by an operator. In each of the three modes of operation, when the number of units 14–20 in service drops to the greater of either the quantity one or to the quantity of one less than the Minimum Number, master controller 12 will prevent automatic regenerations. For example, if the Minimum Number is four and four units 14–20 are in service, then one unit 14–20 can be taken out of service (e.g., for regeneration) before master controller 12 prevents automatic regenerations. In this way, adequate flow through the system is maintained, and at least one unit 14–20 will be in service if the Minimum Number is set appropriately. In general, the Minimum Number can be set anywhere from one up to the total number of units 14–20 able to be brought into service.

The foregoing detailed description has been given for clearness of understanding only, as various modifications could be made without departing form the spirit and scope of the instant invention, as defined in the following claims.

We claim:

1. A method for the treatment of fluid with a plurality of N fluid treatment units connected in parallel, comprising the steps of:

a) providing N threshold values, $F_k$, where each k is a distinct integer from one to N, each $F_k$ is a number between zero and one, and each $F_{k+1}$ is greater than $F_k$;

b) determining the fractional capacity of each one of said N fluid treatment units;

c) treating fluid with N fluid treatment units until any k number of said N fluid treatment units each have a fractional capacity less than or equal to $F_k$;

d) selecting for regeneration the one of said N fluid treatment units having the least remaining capacity;

e) taking the said selected fluid treatment unit out of service; and f) subjecting to regeneration the said selected fluid treatment unit while treating fluid with all of the N−1 remaining said fluid treatment units.

2. The method of claim 1, wherein at least one of said fluid treatment units includes an ion-exchange resin.

3. The method of claim 1, wherein at least one of said fluid treatment units includes a filter for removing solid matter from fluid.

4. The method of claim 1, wherein each $F_k$ is equal to $(k-1)/N$.

5. A method for the treatment of fluid with a plurality of N fluid treatment units connected in parallel, comprising the steps of:
   a) providing N threshold values, $F_k$, where each k is a distinct integer from one to N, each $F_k$ is a number between zero and one, and each $F_{k+1}$ is greater than $F_k$;
   b) determining the fractional capacity of each one of said N fluid treatment units:
   c) treating fluid with N fluid treatment units until any k number of said N fluid treatment units each have a fractional capacity less than or equal to $F_k$;
   d) selecting for regeneration the one of said N fluid treatment units which is:
      1) the fluid treatment unit having the least remaining capacity, unless two or more of said N fluid treatment units have remaining capacities which are the same as or which differ by less than a first predetermined amount from said least remaining capacity, in which case;
      2) the one of said fluid treatment units having remaining capacities which are the same as or which differ by less than a first predetermined amount from said least remaining capacity having the greatest length of time since last regeneration, unless two or more of said fluid treatment units having remaining capacities which are the same as or which differ by less than a first predetermined amount have lengths of time since last regeneration which are the same as or which differ by less than a second predetermined amount from said greatest length of time since last regeneration, in which case;
      3) the one of said fluid treatment units having lengths of time since last regeneration which are the same as or which differ by less than a second predetermined amount from said greatest length of time since last regeneration having the lowest unit number;
   e) taking the said selected fluid treatment unit out of service; and
   f) subjecting to regeneration the said selected fluid treatment unit while treating fluid with all of the N–1 remaining said fluid treatment units.

6. The method of claim 5, wherein at least one of said fluid treatment units includes an ion-exchange resin.

7. The method of claim 5, wherein at least one of said fluid treatment units includes a filter for removing solid matter from fluid.

8. The method of claim 5, further comprising the step of providing at least one standby unit in addition to said plurality of N fluid treatment units, and wherein one of said at least one standby units is brought into service when one of said N fluid treatment units is taken out of service.

9. The method of claim 8, wherein at least one of said fluid treatment units includes an ion-exchange resin.

10. The method of claim 8, wherein at least one of said fluid treatment units includes a filter for removing solid matter from fluid.

11. The method of claim 8, wherein the standby unit is the fluid treatment unit most recently regenerated.

12. The method of claim 8 comprising the following additional steps:
   a) bringing into service one of the said standby units whenever the average per-unit flow exceeds a first preset flow rate for a predetermined amount of time which is:
      1) the standby unit having the least remaining capacity, unless two or more of said standby units have remaining capacities which are the same as or which differ by less than a first predetermined amount from said least remaining capacity, in which case;
      2) the one of said standby units having remaining capacities which are the same as or which differ by less than a first predetermined amount from said least remaining capacity having the greatest length of time since last regeneration, unless two or more of said standby units having remaining capacities which are the same as or which differ by less than a first predetermined amount have lengths of time since last regeneration which are the same as or which differ by less than a second predetermined amount from said greatest length of time since last regeneration, in which case;
      3) the one of said standby units having lengths of time since last regeneration which are the same as or which differ by less than a second predetermined amount from said greatest length of time since last regeneration having the lowest unit number;
   b) taking into standby mode one of said N fluid treatment units whenever the average per-unit flow drops below a second preset flow rate which is:
      1) the one of said N fluid treatment units having the most remaining capacity, unless two or more of said N fluid treatment units have remaining capacities which are the same as or which differ by less than a first predetermined amount from said most remaining capacity, in which case;
      2) the one of said fluid treatment units having remaining capacities which are the same as or which differ by less than a first predetermined amount from said most remaining capacity having the shortest length of time since last regeneration, unless two or more of said fluid treatment units having remaining capacities which are the same as or which differ by less than a first predetermined amount have lengths of time since last regeneration which are the same as or which differ by less than a second predetermined amount from said shortest length of time since last regeneration, in which case;
      3) the one of said fluid treatment units having lengths of time since last regeneration which are the same as or which differ by less than a second predetermined amount from said shortest length of time since last regeneration having the lowest unit number;
   c) bringing into service the one of said standby units when one of said fluid treatment units is regenerated which is:
      1) the standby unit having the least remaining capacity, unless two or more of said standby units have remaining capacities which are the same as or which differ by less than a first predetermined amount from said least remaining capacity, in which case;
      2) the one of said standby units having remaining capacities which are the same as or which differ by less than a first predetermined amount from said least remaining capacity having the greatest length of time since last regeneration, unless two or more of said standby units having remaining capacities which are the same as or which differ by less than a first predetermined amount have lengths of time since last regeneration which are the same as or which differ by less than a second predetermined amount from said greatest length of time since last regeneration, in which case;

3) the one of said standby units having lengths of time since last regeneration which are the same as or which differ by less than a second predetermined amount from said greatest length of time since last regeneration having the lowest unit number.

13. The method of claim 12, wherein at least one of said fluid treatment units includes an ion-exchange resin.

14. The method of claim 12, wherein at least one of said fluid treatment units includes a filter for removing solid matter from fluid.

15. The method of claim 5, wherein each $F_k$ is equal to $(k-1)/N$.

16. An apparatus for the treatment of fluid comprising:

1) a plurality of N fluid treatment units, each one of said fluid treatment units comprising an inlet, an outlet, and means for treating fluid;

2) means for automatically connecting and disconnecting each one of said inlets to a source of untreated fluid and each one of said outlets to a destination for treated fluid;

3) means for automatically regenerating each one of said fluid treatment units;

4) means for automatically determining the total flow through each one of said fluid treatment units;

5) means for automatically determining the remaining capacity of each one of said fluid treatment units;

6) means for automatically determining the fractional capacity of each one of said fluid treatment units;

7) means for providing N threshold values, $F_k$, where each k is a distinct integer from one to N, each $F_k$ is a number between zero and one, and each $F_{k+1}$ is greater than $F_k$;

8) means for determining whether any k number of said N fluid treatment units each have a fractional capacity less than or equal to $F_k$;

9) means for initiating a regeneration when any k number of said N fluid treatment units each have a fractional capacity less than or equal to $F_k$; and 10) means for automatically determining which one of said fluid treatment units to regenerate based on the remaining capacities of each one of said fluid treatment units.

17. The apparatus of claim 16, further comprising:

1) means for automatically determining the time since last regeneration of each one of said fluid treatment units; and 2) means for automatically determining which one of said fluid treatment units to regenerate based on the remaining capacities and time since last regeneration of each one of said fluid treatment units.

18. The apparatus of claim 17, further comprising:

1) means for associating a unique unit number to each of said fluid treatment units; and 2) means for automatically determining which one of said fluid treatment units to regenerate based on the remaining capacities, time since last regeneration, and unit number of each one of said fluid treatment units.

* * * * *